Feb. 13, 1951 — C. N. SUGDEN ET AL — 2,541,790
DIAL INSTRUMENT MOVEMENT
Filed March 23, 1948 — 2 Sheets-Sheet 1
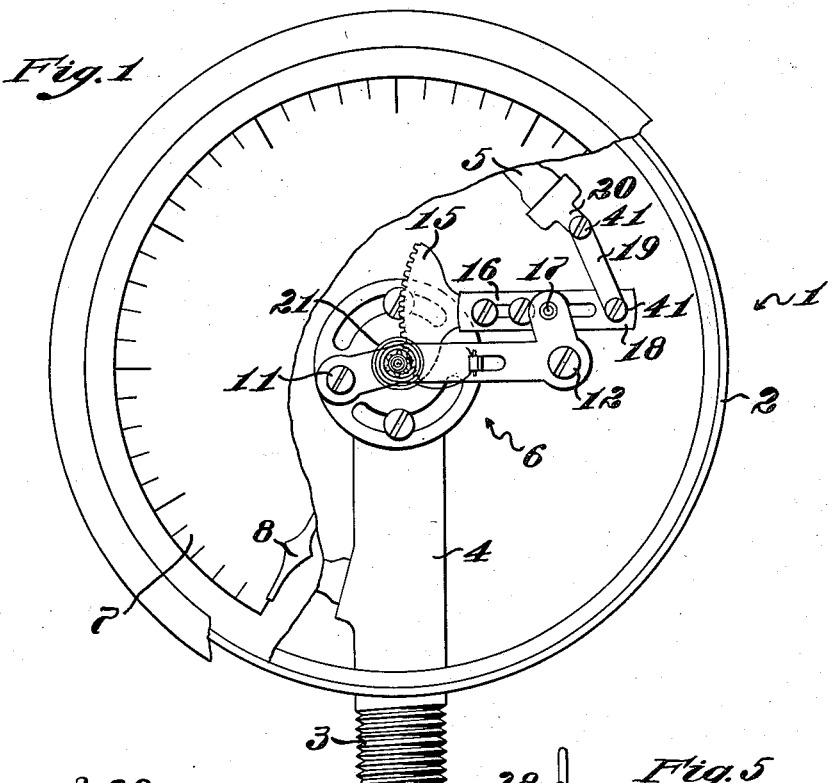
Inventors
Clifford N. Sugden
Donald B. Miner
Albert D. Eplett
by Roberts Cushman Grant
Atty's

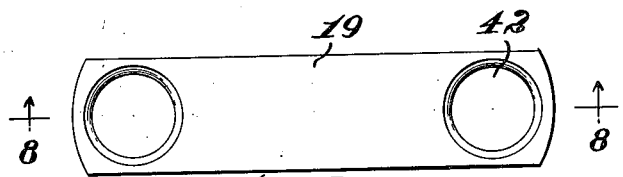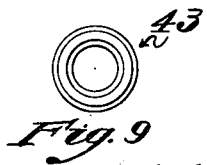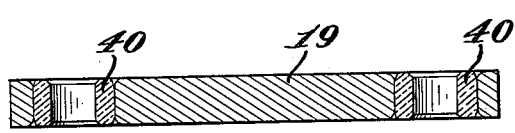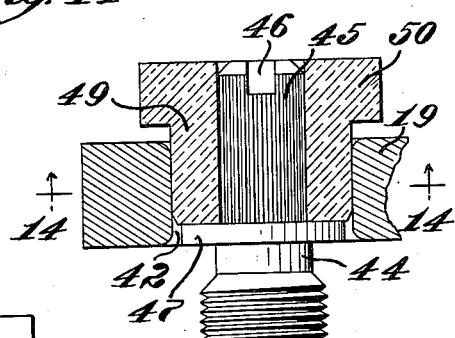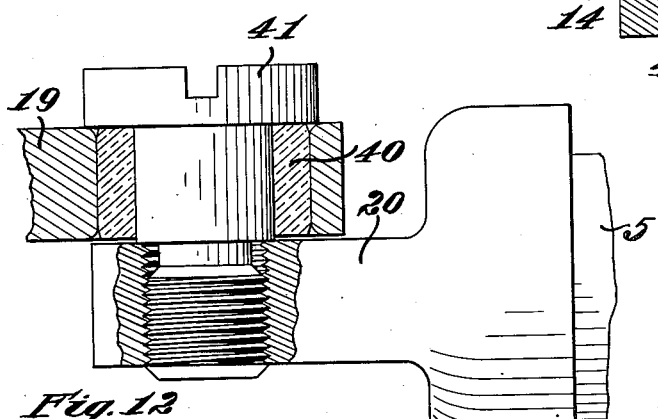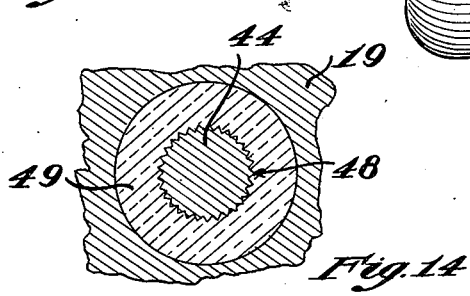

Patented Feb. 13, 1951

2,541,790

UNITED STATES PATENT OFFICE 2,541,790

DIAL INSTRUMENT MOVEMENT

Clifford N. Sugden, Bridgeport, and Albert D. Eplett and Donald B. Miner, Stratford, Conn., assignors to Manning, Maxwell & Moore, Incorporated, New York, N. Y., a corporation of New Jersey Application March 23, 1948, Serial No. 16,518

14 Claims. (Cl. 74—99)

This invention pertains to an improved movement for measuring instruments having motor means responsive to changes in a physical condition such as pressure, temperature, electrical current or potential. The motor means for instruments of this general character includes some element which is responsive to changes in conditions of one kind or another, such element being movable in one direction as the given condition, such as fluid pressure, increases and being movable in the opposite direction as the condition decreases. In pressure gauges, temperature gauges, tachometers, speed indicating devices and the like, this element has a relatively limited extent of motion and a mechanical "movement mechanism" must be employed to translate and multiply this limited motion into rotary movement of substantial arc to an index-supporting staff. The present application is a continuation-in-part of our copending application for Letters Patent Serial No. 691,740, filed August 20, 1946 and now abandoned.

Certain fundamental design principles, such as fit of parts, surface finish, length and diameter of bearings, width of contact points, bearing loads, inertia due to weight of parts, material combinations and hardnesses, must be considered when designing gearing and linkages for use in dial type instruments to combat wear caused by services involving severe and rapid pulsations and/or mechanical vibrations, and still attain desirable responsiveness and accuracy of indication.

Another factor which must often be given consideration is resistance to corrosion, particularly on chemical or similar service applications.

Considerable difficulty is experienced in correctly evaluating and combining these principles into a superior dial instrument mechanism and linkage.

It is difficult to attain desirable smoothness of surface finish and closeness of fit, with metals having increased hardness to combat wear, or to control these qualities when parts are subsequently treated, after original machining, to have increased hardness or surface treatment for corrosive resistance.

To concentrate the wear resistant metal at the shaft bearing points, and permit an extended length of bearing, it is conventional practice in heavy duty movements to utilize bushings of greater axial length than the thickness of the frame plates. The shaft bearing diameters are usually kept relatively small to reduce friction, with length of bearing extended to increase wear resistance. It is not usually practical to employ lubricating oils or greases at the bearing and contacting points, because oil soon collects dust and becomes gummy, thus reducing freedom of movement, which the small amount of power, afforded by the pressure or temperature responsive element to which the movement is connected, can not overcome.

For conventional applications, the mechanism must therefore operate without the aid of lubricating oils or greases, and wear, resultant from pulsation or vibration, is mostly of the "fretted" type, wherein the molecules of the mating materials tear against each other to destroy original fit and smoothness of parts, until eventually enough material is worn away so as to render the movement inoperative, or even lose contact between parts.

An ideal movement and linkage for dial instruments would therefore be made from materials which would easily permit attainment of close fits, smooth surfaces, large bearing diameters to reduce loading, but still afford low friction, low inertia, elimination of fretted wear, superior corrosive resistance, and smooth sensitive operation without externally applied lubrication. The materials contacting at wear points should have the quality of improving smoothness by burnishing action under all conditions of operation.

Ever since gauges and instruments of this type were made, using the customary metal-to-metal type of movement customarily employed in commercial designs, all manner of machine and subsequent finishing and polishing methods have been devised to insure what might be called a "polished surface" of pinion and segment teeth, staff and bearings, and link and pivot screw. The eye measure of a good movement is customarily the inspection of the surface finishes under a microscope. This phase of manufacture is almost as important as the choice of the materials themselves, in accordance with usual prior practice. Obviously, if all of these parts could be made at a low cost and with a surface approaching the "superfinish" found in automobile cylinders, the wearing qualities of instrument movements would be greatly improved.

The use of plastics, which are much more elastically yieldable than metals, avoids the necessity for superfinishing of the contact surfaces involved and reduces noise. Plastic gears, in the past, have been used primarily because they provide a good means for holding lubricants for longer periods of time than metal gears. However, the utilization of such plastic materials in dial instrument mechanisms has not heretofore been practiced, doubtless in part, at least, because the plastics heretofore used in making gears were not resistant to the fretted type of corrosion which occurs especially when contacting moving parts are operated without lubrication, and partly because in instruments of precision, where parts are delicate and tolerances are very small, the high thermal coefficient of expansion of plastics, as contrasted with that of brass, for example, has indicated the use of any plastic to be impractical.

The present invention is based upon our discovery, as the result of extended research and experiment, that among the polyamide resins of the genus known as "nylon" are some having definite physical characteristics such that when employed in making one of a pair of relatively moving contacting parts, for instance in making one of a pair of gears, the other of which is of aluminum, the above desirable properties are attained to a degree not approached by other known materials, and upon our further discovery that in a measuring instrument whose parts are delicate and in which great accuracy is demanded, those nylons having the requisite strength and rigidity may be employed to advantage as gear elements, bearings, staffs, etc., if their thermal expansion be compensated for, for example, by making the supporting structure of a material having a similar coefficient of expansion.

We are aware that it has heretofore been proposed to use nylon as a bearing for a rotating shaft. This is suggested, for example, in the patent to Austin No. 2,246,086, dated June 17, 1941. However, difficulty in the use of nylon for such purposes has been encountered due to the high coefficient of thermal expansion of nylon and various proposals have been made to overcome these difficulties. One such proposal, for example, may be found in the patent to Stott No. 2,459,398, dated January 18, 1949. So far as we are aware it has not heretofore been suggested that these difficulties might be overcome and other desirable and wholly unpredictable results might be obtained when one of the parts of a pair of relatively rotating, contacting elements is of nylon and the other of aluminum.

Aluminum is not widely nor customarily employed as a material for making shafts, etc., and other moving mechanical elements by reason of its softness and lack of wear resistance and rigidity; as a practical matter it is seldom used for such purposes in heavy machinery. However, we have discovered that in certain light and delicate instruments, such as dial instruments (pressure gauges, dial thermometers, etc.) aluminum may be used to great advantage as a shaft, gear tooth or the like, if it be employed as one of the contacting elements of a pair of complemental parts where the other of said elements is of nylon. Just why aluminum should be especially advantageous in such a situation (except that its coefficient of expansion is more than that of brass, for instance) is not fully understood, although it may perhaps be attributed in part to the fact that aluminum, particularly when anodized (which is the usual present-day practice in the use of aluminum in industry) does not oxidize when exposed to atmospheric moisture or usual atmospheric gases. The particular advantage arising from the employment of nylon and aluminum in such a combination is the substantially complete elimination of fretted wear when the mechanism or instrument of which it forms a part is subjected, during use, to prolonged vibration or pulsation induced by forces external to the instrument. Another advantage in the use of aluminum in such instances, particularly for a part which reciprocates or oscillates, results from the very light weight of aluminum whereby the mass of the oscillating or reciprocating part is reduced (as compared to that of a similar part made of brass) thus minimizing the hammer action which takes place at each movement and which no doubt contributes to fretted wear or distortion of those parts which are in contact at the instant of reversal.

The principal object of the present invention is to provide an improved movement mechanism for a dial instrument which is extremely accurate; which is highly resistant to wear under all conditions of use; which does not require lubrication; and which may be made more easily and cheaply than prior movement mechanisms of comparable accuracy and durability. A further object is to provide a movement mechanism for dial instruments which is accurate and durable, without necessitating the use of bushed or jewel bearings for the shafts or staffs which carry the gear elements. A further object is to provide a movement mechanism for measuring instruments in which advantage is taken of the wear resistant characteristics of nylon in substitution for metal. A further object is to provide a movement mechanism wherein one or more of a given pair of relatively moving parts is of a polyamide resin having the physical characteristics of nylon, arranged in working cooperation with a movement part which is of a metal which is not subject to corrosion when exposed to environmental atmospheric conditions. A further object is to provide an improved movement mechanism wherein certain of the moving parts are of nylon which has a high coefficient of expansion as compared with that of metal, but with provision for compensating for this characteristic of the nylon, thereby to prevent binding or looseness of the parts in response to temperature change. A further object is to provide a movement mechanism wherein one or more of the interengaging gear elements is of nylon, but having the frame which carries the moving parts so devised as to compensate for the thermal coefficient of expansion of such a gear element or elements. A further object is to provide a dial instrument having a movement mechanism, mounted in a frame having a coefficient of thermal expansion approximating that of aluminum, and including intermeshing gearing elements, and wherein one at least of said elements is of a nylon which is tough, wear-resistant, has a high degree of elasticity, which is resistant to wear, and which does not corrode when exposed to moisture, steam, vapor, or most chemicals. A further object is to provide a movement mechanism having provision for minimizing wear in the pivotal connection at the ends of the motion-transmitting link. Other and further objects and advantages of the invention will be pointed out in the following more detailed description and by reference to the accompanying drawings wherein Fig. 1 is a front elevation of a conventional Bourdon tube instrument, portions of the dial and transparent cover glass being broken away to show the movement mechanism;

Fig. 2 is an edge elevation, to larger scale, of the movement mechanism illustrated in Fig. 1;

Fig. 3 is a fragmentary plan view, to larger scale, of the intermeshing gear elements of the movement mechanism of Fig. 2, the staff which carries the segment gear being in transverse section;

Fig. 4 is a fragmentary diametrical section to larger scale through the pinion and staff of the movement mechanism of Fig. 2;

Fig. 5 is a view generally similar to Fig. 2, but with certain parts in vertical section, illustrating a movement mechanism of slightly modified construction;

Fig. 6 is a fragmentary plan view showing the intermeshing gear elements of the movement mechanism of Fig. 5;

Fig. 7 is a plan view, to large scale, of a motion-transmitting link in readiness for the insertion of the bearing bushing;

Fig. 8 is a section on the line 8—8 of Fig. 7;

Fig. 9 is a plan view, to large scale, of a bushing in readiness for insertion in the opening in the end of the link;

Fig. 10 is a diametric section through the bushing of Fig. 9;

Fig. 11 is a section similar to Fig. 8 but showing the completed link with the bushings in place;

Fig. 12 is a fragmentary side elevation, to very large scale, showing a portion of a link and tube tip bracket pivotally united in accordance with one embodiment of the present invention;

Fig. 13 is a view generally similar to Fig. 12 but showing a modified form of pivotal connection, but not completely assembled; and Fig. 14 is a fragmentary section on the line 14—14 of Fig. 13.

In attaining the above objects, either one or both of the intermeshing gear elements, that is to say, the pinion and segment gear, is or are made of a nylon. The shafts or staffs which carry these gear elements may also be of a similar nylon. Likewise, one of the pair of relatively moving elements constituting the pivotal connection at each end of the motion-transmitting link is desirably of such a nylon. Lubrication of instrument parts is not considered practical, but nylon is characterized by its good wearing properties in the absence of any lubrication and by its low coefficient of friction in contact with aluminum as compared with metal-to-metal combinations. Since the influence of friction on gauge performance increases as bearing diameters are increased, it has usually been considered necessary to use staffs of as small diameter as possible, but by the use of nylon it is permissible to use staffs of substantially larger diameter than has heretofore been customary, which is a substantial advantage from the manufacturing standpoint.

As above noted, the polyamide resin nylon is unique in respect to its resistance to fretted corrosion, and, from the standpoint of wear resistance, and in contact with aluminum, provides optimum effects.

Since most organic plastics, as above suggested, have high coefficients of thermal expansion, as compared with brass, for example, the previous attempted use of these materials in instruments of precision has resulted in binding or loosening of the parts as the temperature changed, and thus it has been considered impractical to employ plastics in such locations. In accordance with the present invention, this tendency for the parts to bind or become loose is substantially avoided by the simple expedient of using frame plates of aluminum or other material whose coefficient of expansion is much nearer to that of the nylon than that of brass or other metals heretofore commonly employed.

Referring to the drawings, the numeral 1 designates a dial instrument, here illustrated as a Bourdon tube pressure gauge, embodying the present invention. However, it is to be understood that the present invention is applicable to dial instruments of other types and regardless of the motor device employed and regardless of the physical characteristics to which the instrument responds. As illustrated, the instrument comprises a case 2 which is carried by a bracket including the nipple portion 3 for attachment to a pipe or conduit, and a part 4 which forms the support for the Bourdon tube 5 and the movement mechanism 6. The case also houses the graduated dial 7 with which cooperates the movable pointer or index 8. The front of the case is usually closed to protect the interior parts by a transparent panel or cover glass.

The frame of the movement mechanism, which is mounted upon the upper part of the bracket 4, is here shown as comprising parallel front and rear plates 9 and 10, respectively. Preferably these plates are of aluminum, which is not subject to corrosion when exposed to usual environmental atmospheric conditions, the thermal coefficient of expansion of aluminum more nearly approximating that of nylon than does that of brass customarily used for the purpose. However, other materials not subject to atmospheric corrosion and particularly those having expansion characteristics approximating those of nylon employed may be used instead of aluminum. These plates are preferably arranged as close together as is practicable, allowing room between them for the pinion and its adjustable actuating segment. The plates are held in properly spaced relation by the posts 11 and 12. A rotary staff 13 carries the pinion 14 which meshes with the segment gear 15 (Fig. 3) which is adjustably connected to the lever 16 which is carried by a rotary staff 17 parallel to the pinion staff 13. Preferably the staff 17 is of nylon, like the staff 5 as hereafter more fully described. The lever 16 has a tail portion 18 which is connected by a link 19 to the tip bracket 20 at the free end of the Bourdon tube 5. As shown in Fig. 2, the instrument is also provided with a hairspring 21 (located above the plate 9), one end of which is connected to a collet 22 fixed to the pinion staff 13, and the other end of which is secured to a fixed part, here shown as a post 23, integral with the front plate 9. The parts as thus far described, and except as herein more specifically defined, are in general conventional to instruments of this type.

In accordance with the present invention, either the pinion 14 or the segment gear 15 is made of a non-metallic material. The other one of the pair of intermeshing gear elements may be of aluminum, aluminum alloy or other metal not subject to atmospheric corrosion.

We have discovered that polyamide resin (of the long molecular chain type comprised in the genus of substances known as "nylons") but which is physically characterized in being moldable, highly elastic, tough, shape-retaining and resistant to plastic flow up to a temperature of 250° F. and which is wear-resistant and not deteriorated by exposure to moisture, is highly effective, particularly when the complementary part of the pair is of aluminum, in inhibiting fretted wear.

Referring to Fig. 4, the pinion 14 is shown as integral with its staff 13. This pinion and its staff are portions of a single mass of nylon having the physical characteristics just above described. This material may be molded accurately to the approximate shape of the intended part, thus minimizing the amount of machine work requisite to bring the part within the requisite tolerances (0.0005 inch) demanded by the trade, and after molding, retains the dimensions imposed during manufacture. Future refinements in the plastic moulding art may make it possible to make these parts by pressure moulding alone, without requiring finishing operations. Such highly elastic synthetic resins as nylon are extremely resistant to wear when used as one of a pair of relatively moving engaging parts, for instance when a pinion made of this material is used in association with a segment gear, made of aluminum, the resistance to wear is astonishingly great even though the instrument be subjected to violent and continued vibration and shock, so that the life of the instrument is as much as twenty-five times that of conventional instruments of the same type.

As illustrated in Fig. 4, the staff of the pinion comprises a lower end portion 24 of reduced diameter and a similar upper portion 25 of reduced diameter, the portions 24 and 25 terminating at shoulders 26 and 27, respectively, these shoulders being spaced apart a distance substantially equalling the distance between the inner surfaces of the frame plates 9 and 10. The parts 24 and 25, constituting the journal portions of the staff, are designed to turn dry (that is, without lubrication) in aligned unbushed openings in the plates 9 and 10. By reason of the wear-resistance of the nylon used in making the pinion staff, it is unnecessary to provide bushings in the openings in the frame plates. The aluminum-to-nylon unlubricated pair tends to produce a burnished contact surface rather than to seize and "fret" as is common when an unlubricated metal-to-metal pair is employed. Thus, the accuracy of turning of the pinion staff in its bearings is retained through long periods of use. Obviously, bushings may be used at the staff bearings, if desired, but the present invention eliminates necessity for bushings.

As illustrated, the pin 28 is arranged coaxially with the pinion staff, having one end portion embedded in the substance of the staff, the other end of the pin projecting beyond the end of the staff proper and constituting a support for the index or pointer 8. The pin 28 is of stiff metal, for instance, stainless steel, which does not bend or flex easily, so as to insure the accurate centering of the pointer with respect to the axis of the pinion staff. While the staff itself might be extended to form a support for the pointer, the nylon of the staff, if reduced in diameter to the desired amount to form a direct support for the pointer, would not ordinarily have sufficient stiffness as respects bending.

In the arrangement shown in Figs. 1 to 4, the segment gear 15 is of metal, preferably aluminum. It is also desirable to make the lever 13 of aluminum or similar metal, thus reducing the weight of the moving parts as much as possible, but, more important, insuring a close approximation, with respect to thermal expansion, of all of the materials employed. An aluminum-nylon pair has been found by extensive test to provide an exceedingly high wear-resistance and freedom from binding throughout a wide temperature range.

In the arrangement shown in Figs. 5 and 6, the pinion staff 29 with its pinion 30 are integral portions of a mass of nylon, as above described. The lower end of the staff is reduced in diameter, as shown at 31, and turns in an unbushed bearing opening in the frame plate 10. Likewise the upper end portion 32 of the staff is reduced in diameter and turns in an unbushed bearing opening in the frame plate 9. A collet 34 is fixed to the staff 29 and carries one end of the hairspring 35, the opposite end of which is secured to the post 11 at the point 36. In this instance the frame plates 9 and 10 are spaced apart sufficiently to accommodate the hairspring between them.

The segment gear 37 is of nylon and is mounted upon the lever 16 in the same way as the usual metal segment gear and meshes with the pinion 30. However, only the toothed margin of the segment gear need be of nylon, the remainder of the gear being of metal, with suitable means uniting the toothed margin to the body of the gear. If desired, as above suggested, only the segment gear 37 may be of nylon, and the pinion with which it meshes may be of the usual metal employed in such instruments.

While improved results so far as wear, accuracy, low cost, etc. are obtained by the construction above described (as compared with usual prior construction), further and important advantages in these and other respects are attainable by the use of novel pivotal connections at the ends of the motion-transmitting link 19.

Customarily the link is of brass having reamed holes at opposite ends for the reception of shouldered pivot screws. These pivotal connections are subjected in use to compressive stress coupled with slight relative rotation of the parts, a condition which produces fretted corrosion and rapid wear, resulting in inaccuracy of operation of the instrument. In accordance with the present invention, one of the pair of cooperating pivotal elements at each end of the link is of a nylon and the other element of said pair is of aluminum.

As illustrated in Figs. 11 and 12, the link 19 is provided at each end with a bushing 40 of nylon, each bushing having a bearing bore which is accurately dimensioned to receive a shouldered aluminum pivot screw 41, one such screw attaching the link to the tube tip bracket 20, and the other screw attaching the link to the tail 18 of the segment lever 16. Repeated tests under the most severe conditions of shock and vibration show conclusively that this construction is far superior to accepted prior arrangements.

Preferably the bushings 40 are set into the end of the link substantially as follows: First, cylindrical bores 42 at the ends of the link are machined to accurate diameter, but these cylindrical bores are provided with smoothly rounded corners where they merge with the faces of the link. The bushing 43 is machined to an external diameter slightly greater than the diameter of the cylindrical bore 42, and is provided at its opposite ends with chamfered edges (for example, a 30° taper) but the internal bore of the bushing is not at this time of final diameter. The bushing 43 is then force-fitted into the bore 42 in the link, the chamfered end of the bushing facilitating its entrance while the rounded edge of the bore 42 prevents shearing off the material of the bushing. After the bushing has thus been set into the link, the bore of the bushing is accurately machined to the final desired diameter.

Instead of inserting a nylon bushing into the link and pairing therewith an aluminum pivot screw, similar functioning results may be obtained by using a pivot screw whose journal portion, at least, is of nylon, arranged to turn in an unbushed bearing in the aluminum link. However, since nylon does not thread well, at least with fine threads such as are requisite in pivot screws of this type, it is preferable to employ the construction illustrated in Figs. 13 and 14. The link 19 (Fig. 13) is provided with the bearing openings as above described, but the pivot screw comprises a metallic shank 44 screw threaded at its lower end like the screw 41, but having its upper cylindrical body portion or core 45 of reduced diameter, as compared with the threaded portion. This upper part 45 may have a screw driver slot 46 in its upper end and preferably has a radial supporting flange 47 above which the body portion is knurled or toothed, preferably with fine, longitudinally extending teeth, as shown at 48. The head of the screw consists of a body of nylon shaped to provide the tubular cylindrical journal part 49 which turns in the opening 42 in the link. This screw head initially has a bore slightly less in diameter than the diameter of the part 45, and is forced down onto the latter so that the teeth 48 become embedded in the substance of the head, so as to prevent relative rotation of the head and shank. The head is forced down until its lower end engages the flange 47. The head has an upper portion 50, of a diameter larger than the portion 45, which overhangs the link and prevents the link from escaping from the screw.

Since nylon, like other synthetic resins, is subject to relatively large expansion and contraction in response to humidity and temperature variations, it is desirable to perform the above operations, in particular the dimensioning of the nylon parts under predetermined standard temperature and moisture conditions, in order to insure uniformity of product. It is also desirable to dry the nylon for at least twenty-four hours at approximately 250° F. and then to perform the machining operations within three days after the completion of the drying and to make the final inspections within two days after machining. Usually, so far as temperature and moisture are concerned, the operations may be carried out under ordinary factory conditions, providing the nylon is properly dried and the work is carried out within the period above suggested. At this point it may be noted that one of the most important features of the use of a relatively moving pair comprising nylon and aluminum parts is that the products of wear are not abrasive and thus do not accelerate the wear, as is the case with a metal-to-metal pair.

As above suggested, optimum results, as respects wear resistance and prolonged useful life, are only attained by the use of nylon as one element at least of the cooperating pair. As above pointed out, the use of polyamide resin (nylon) as one of a pair of contacting, relatively moving parts of which the other is of a metal which is not subject to atmospheric corrosion, inhibits wear of the fretted type, even when, as in dial instruments, the unlubricated moving parts are subjected to continuous vibration occasioned by force wholly external to the instrument itself.

While certain desirable embodiments of the invention have been illustrated and described, it is to be understood that the invention is broadly inclusive of any and all modifications falling within the scope of the appended claims.

We claim:

1. A movement for a measuring instrument which may be subjected for long periods, when in use, to vibration, and having motor means responsive to changes in conditions, said movement comprising in combination a pair of unlubricated contacting parts having relative rotational motion, one of the parts of said pair being of aluminum and the other of said parts being of nylon which is tough, wear resistant, capable of withstanding a temperature of 250° F. without plastic flow or substantial change in shape, which does not deteriorate when exposed to moisture and which has a low coefficient of friction whereby said contacting parts, though unlubricated, turn without fretting wear.

2. A movement for a measuring instrument as set forth in claim 1, wherein the contacting parts of said pair are toothed gear elements.

3. A movement for a measuring instrument as set forth in claim 1, wherein the contacting parts of said pair are a staff for supporting a gear element and a bearing in which the staff turns.

4. A movement for a measuring instrument which includes motor means responsive to changes in conditions, and which may be subjected for long periods, when in use, to vibration, said movement comprising two intermeshing gear elements one of which is an oscillatory segment gear, a staff supporting each of said gear elements respectively, and a frame comprising aluminum parts having unlubricated journal bearings therein for the opposite ends respectively of said staffs, one of said gear elements being of aluminum and the other of said gear elements and both of said staffs being of a nylon which is tough, highly elastic, wear resistant and has a low coefficient of friction whereby fretted wear between the relatively movable contacting parts is inhibited.

5. A movement for a measuring instrument as set forth in claim 1 wherein the relative rotatable, contacting parts of said pair are a motion-transmitting link and a pivot member which connects the link to another movable part.

6. In combination in a movement for a measuring instrument which includes a pinion, a staff supporting said pinion, a frame comprising aluminum parts having therein unlubricated journal bearings for the reception of the opposite ends respectively of said staff, the staff being of a tough, highly elastic, shape-retaining nylon, and a metal pointer-supporting pin extending axially of and having one end embedded in the substance of the staff.

7. A movement for a measuring instrument having motor means responsive to changes in conditions, said movement comprising in combination two intermeshing gear elements, a staff supporting each of said gear elements, a frame having spaced parallel rigid plates, the plates being of aluminum and having journal bearings for the staffs, one of the gear elements being of aluminum and the other gear element being of a highly elastic, moldable polyamide resin having a low coefficient of friction, which is tough, wear-resistant, capable of withstanding a temperature of 250° F. without plastic flow or substantial change of shape, and which is unaffected by moisture, both staffs being of a polyamide resin having physical characteristics similar to those of which the latter gear element is made, both of the staffs turning dry in bearings in the respective plates.

8. A movement for a measuring instrument as set forth in claim 1 and which includes a motor-actuated part, a gear segment, mounted upon one arm of a lever, which engages a pinion on a rotary staff, a link which transmits motion to a second arm of the lever from said motor-actuated part and pivot means uniting the opposite ends respectively of the link to said motor-actuated part and lever arm, wherein the relatively rotatable, contacting parts are bushings of nylon set into the substance of the link at each end of the latter respectively and metallic screws each having a cylindrical bearing portion which fits into the bore of the corresponding bushing, the respective screws having threaded engagement with threaded openings in the motor-actuated part and in the lever arm respectively.

9. A movement for a measuring instrument as set forth in claim 1 and which includes a motor-actuated part, a gear segment, mounted upon one arm of a lever, which engages a pinion on a rotary staff, a link which transmits motion to said lever from the motor-actuated part, pivot means uniting the opposite ends respectively of the link to the motor-actuated part and to the lever, wherein the relatively rotatable, contacting parts are bushings of nylon each having a force fit in a bore in one of the respective ends of the link and shouldered pivot screws each having a threaded end, the threaded ends of the two screws engaging threaded openings in the motor-actuated part and in the lever respectively, each screw having a cylindrical journal portion intermediate its ends which accurately fits in the bore in its bushing.

10. A movement for a measuring instrument as set forth in claim 1 and which includes a motor-actuated part, a gear segment mounted upon one arm of a lever and which engages a pinion on a rotary staff, a link which transmits motion to the lever from the motor-actuated part, and pivot means uniting the opposite ends respectively of the link to the motor actuated part and lever, wherein the relatively rotatable, contacting parts are shouldered pivot screws one at each end of the link, each screw having a journal portion of nylon arranged to turn in an unbushed bore in one of the respective ends of the link, each pivot screw also having a screw threaded portion.

11. A movement for a measuring instrument as set forth in claim 1 wherein one of the relatively rotatable, contacting parts is a journal element and the other is a bushing of nylon having a bore in which said journal element turns.

12. A movement for a measuring instrument as set forth in claim 1 wherein the frame of the instrument comprises parallel spaced, relatively fixed plates of aluminum and parallel spaced staffs journaled in the plates, the relatively rotatable, contacting parts being meshing toothed gear elements fixed to the respective staffs.

13. A movement for a measuring instrument as set forth in claim 1 and which includes an aluminum link for transmitting motion from said motor means to an oscillatory gear element wherein the relatively rotatable, contacting parts of said pair are a shouldered screw having a metallic core, screw threaded at one end and having a screw driver slot in its other end, each screw having a cylindrical journal portion of nylon, the link being the other of said parts and having an unbushed bearing bore which receives the journaled portion of the screw.

14. A movement for a measuring instrument according to claim 1 and which includes an aluminum link for transmitting motion from said motor means to an oscillatory gear element wherein the relatively rotatable, contacting parts of said pair are a screw having a metallic core screw threaded at one end, the core having a cylindrical portion provided with longitudinally extending teeth and having a cylindrical, tubular journal portion of nylon, said journal portion being engaged by the teeth upon the core thereby to prevent relative rotation of the core and journal portion, the other of said parts being the link, the latter having an unthreaded bore which receives the journal portion of the screw.

CLIFFORD N. SUGDEN.
ALBERT D. EPLETT.
DONALD B. MINER.

REFERENCES CITED

The following references are of record in the file of this patent:

UNITED STATES PATENTS

| Number | Name | Date |
|---|---|---|
| 714,771 | Azadian | Dec. 2, 1902 |
| 1,499,657 | Heise et al. | July 1, 1924 |
| 2,135,950 | Rodanet | Nov. 8, 1938 |
| 2,244,334 | Hopkins | June 3, 1941 |
| 2,246,086 | Austin | June 17, 1941 |
| 2,246,092 | Gilman | June 17, 1941 |
| 2,459,598 | Stott | Jan. 18, 1949 |

FOREIGN PATENTS

| Number | Country | Date |
|---|---|---|
| 387,660 | Great Britain | May 5, 1931 |

OTHER REFERENCES

Ser. No. 361,149, Junghans (A. P. C.), published Apr. 27, 1943.

(M. I. T.) Technology Review Magazine, May 1939, page 294.

Plastics in Engineering, by J. Delmonte, 1st Edition, 1940, Penton Pub. Co., Cleveland, pgs. 407 and 414.

"Motors," for May 1940, page 88.

"Products Engineering," for September 1948, pgs. 140 and 141.